May 8, 1973 A. T. ZAPPIA 3,732,088
BLOW HEAD ASSEMBLY

Filed Aug. 30, 1971 2 Sheets-Sheet 1

INVENTOR
ANTHONY T. ZAPPIA
BY
Hood, Gust, Irish, Lundy & Coffey
ATTORNEYS

United States Patent Office 3,732,088
Patented May 8, 1973

---

3,732,088
BLOW HEAD ASSEMBLY
Anthony T. Zappia, 7576 Ivywood Drive, Apt. A,
Indianapolis, Ind. 46250
Filed Aug. 30, 1971, Ser. No. 176,054
Int. Cl. C03b 9/14
U.S. Cl. 65—261                                    6 Claims

ABSTRACT OF THE DISCLOSURE

A blow head assembly for forming hollow glassware, the assembly being adapted for arrangement near a blow mold into which parisons are successively dropped, and comprising an arm carrying a blow head and mounted to swing about a horizontal axis between a horizontal position in which the arm overlies the mold with the blow head in spaced registry with the mold, and an elevated positioned in which the arm is laterally withdrawn from the mold, the pivotal mounting for the arm being carried by a post arranged for limited rectilinear reciprocation, and a reciprocator parallel with the line of reciprocation of the post, operative to swing the arm between its stated positions and effective to cause the post to move synchronously with the reciprocator when the arm is in horizontal position to shift the blow head rectilinearly into and out of mating engagement with the mold.

---

The present invention relates to a blow head assembly for use in forming hollow glassware. In accordance with conventional practice, a measured gob of molten glass is dropped into a parison mold, a plunger enters the mold to shape the parison, the shaped parison is then removed from the mold and transferred to a blow mold, a blow head is mated with the parison-containing blow mold and air under pressure is introduced to form the glass to the shape of the mold and then the shaped piece is removed from the blow mold. During transfer from the parison mold to the blow mold, the parison is supported from its open end and is usually introduced downwardly into the blow mold. Since the blow head must achieve mating engagement with the open end of the parison to accomplish the blowing step, it is obvious that, during such transfer, the blow head must be moved out of the way of the parison transfer device. Sometimes this is done by lifting the blow head vertically to a level above the path of the transfer device. For the sake of space economy, however, it is preferable to swing the blow mold about a horizontal axis to remove it laterally from the region above the blow mold. However, if the whole path of movement of the blow head is arcuate, it may damage the finish of the article being formed.

A primary object of the present invention, then, is to provide a blow head assembly in which, during deposit of a parison in a blow mold, the blow head, carried by an arm which is mounted to swing about a horizontal axis, is in an elevated position, laterally offset from the blow mold and to provide means whereby, after such deposit, the arm will be swung downwardly into a position wherein the blow head is in spaced registry with the parison in the blow mold, after which the blow head will be rectilinearly moved downwardly into mating engagement with the blow mold while the carrying arm maintains its horizontal attitude. After the blow, the actuating means must cause the blow head to move vertically rectilinearly away from the blow head for a predetermined distance and then to swing arcuately away from its overlying relation to the blow mold to return to its elevated, laterally-offset starting position.

A further object of the invention is to provide simple, inexpensive apparatus to produce the motion above described rapidly, accurately and dependably with a minimum number of moving parts and a minimum liability to wear and damaging shock.

Further objects of the invention will appear as the description proceeds.

To the accomplishment of the above and related objects, my invention may be embodided in the form illustrated in the accompanying drawings, attention being called to the fact, however, that the drawings are illustrative only, and that change may be made in the specific construction illustrated and described, so long as the scope of the appended claims is not violated.

Figures 1, 2:
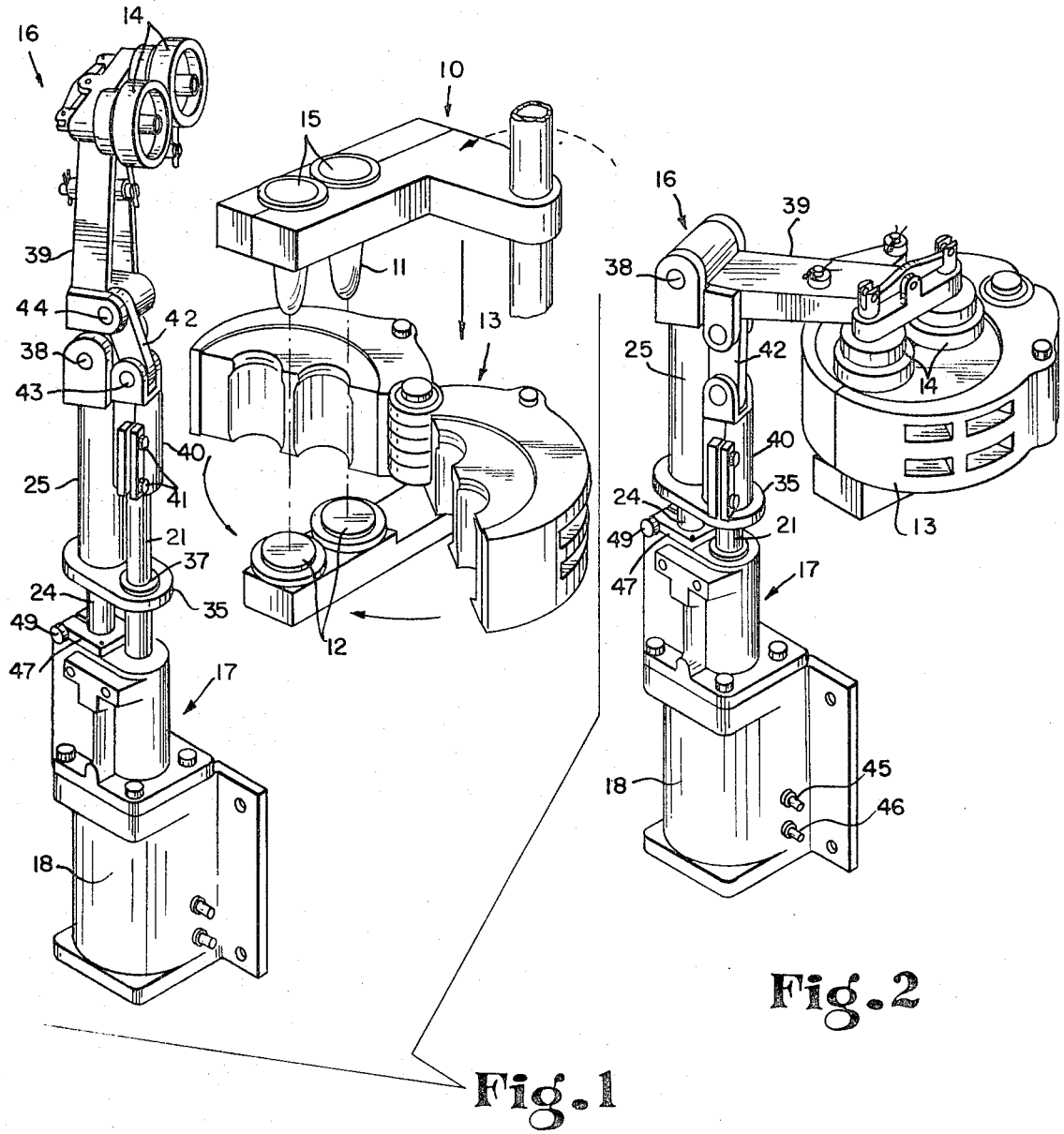
FIG. 1 is a somewhat diagrammatic, perspective illustration of a blow head assembly constructed in accordance with the present invention and shown in association with a blow mold and a parison transfer device, the parts being in position for introduced of a pair of parisons to the blow mold.
FIG. 2 is a somewhat similar view showing the parts in position for blowing.

Referring more particularly to the drawings, it will be seen that I have suggested a conventional transfer device indicated generally by the reference numeral 10 and constructed and arranged to transfer a pair of parisons 11 from a double parison mold (not shown) to the base pads 12 of a conventional, separable double blow mold 13. As the device 10 descends, the mold 13 closes to grasp the parisons 11 as the device 10 opens to release the parisons. With the parisons supported in the blow mold, the device 10 moves away from registry with the blow mold, and the blow heads 14 will move into mating engagement with the blow mold 13 to inject air under pressure into the open mouths 15 of the parisons, whereby the plastic molten glass will be caused to flow into conformity to the cavities of the blow mold 13.

The mechanism now to be described, and indicated generally by reference numeral 16, for shifting the blow heads 14 between the position of FIG. 1 and the position of FIG. 2, constitutes the present invention.

In the particular embodiment shown, a base 17 is supported upon the casing of a preferably pneumatic motor 18 which comprises a cylinder 19 reciprocably receiving therein a piston 20 to which is connected a piston rod or reciprocator 21 guided for reciprocation in a vertical bore 22 formed in the base 17. Suitable connections 45 and 46 communicate respectively with the upper and lower ends of the cylinder 19 and may be connected in a conventional manner with a source of air under pressure and with exhaust.

The base 17 is formed to provide a second bore 23 close to, and parallel with, the bore 22; and a tube 24 is fixedly received in said bore 23 to serve as guide means for a post 25 arranged for limited reciprocation relative to said guide means 24. As is clearly to be seen in FIGS.

3 and 4, the post 25 is formed with an axial cavity comprising a bore 26 opening through its upper end and a larger bore 27 opening through its lower end, said bores 26 and 27 being connected through a restricted bore 28 defining an upwardly facing shoulder 29 and a downwardly facing shoulder 30. The head 31 of a pin having a stem 32 is snugly slidably received in the bore 26, while said stem penetrates the bore 28 and extends downwardly into the upper end portion of the tube 10 which is telescopically received in the bore 27. The pin stem 32 is fixedly secured to the tube 10 by means of a pin 33, and an expansion spring 34 is sleeved on said pin stem and is confined between the anchor means 33 and the downwardly facing shoulder 30 to urge the post 25 upwardly relative to the base 17, upward movement of said post being limited by the engagement of shoulder 29 with the pin head 31. It will be clear that the post 25 may move downwardly relative to the base 17, against the resistance of the spring 34, until the shoulder 30 engages the upward extremity of the tube or guide 24.

A lateral extension 35, which may be integral with or suitably secured to the post 25, intersects the line of reciprocation of the reciprocator 21 and there is formed with a perforation 36 through which the reciprocator 21 extends. Preferably, a bushing 37 is disposed in said perforation 36 and has a snug, sliding fit with the reciprocator 21.

At its upper end, the post 25 carries a horizontal pivot pin 38 upon which is hinged an arm 39 which, as will be seen in FIGS. 1 and 2, carries the blow heads 14, whereby said arm is mounted to swing in the plane which is common to the axes of reciprocation of the post 25 and the reciprocator 21.

A head 40 is suitably secured to the upper end of the reciprocator 21. In the illustrated embodiment of the invention, the head 40 is formed as a clamp and is provided with clamping screws 41 whereby it may be vertically adjustably secured to said reciprocator 21. Link means 42 is pivoted at 43 to the head 40 and at 44 to the arm 39 at a point distally spaced from the pivot pin 38.

Figure 4:
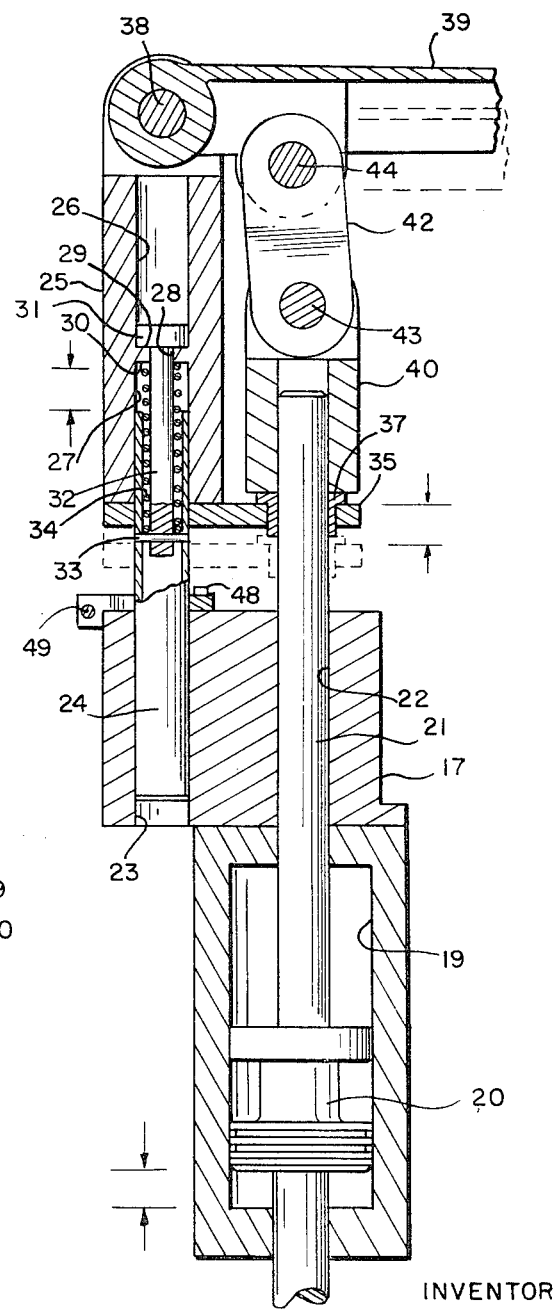
FIG. 4 is a similar section showing, in solid lines, the relationship of the parts when the blow head first reaches spaced registry with the blow mold and, in broken lines, the positions of the parts when the blow head achieves mating engagement with the blow mold.

It will now be apparent that, when fluid under pressure is supplied to the upper end of the cylinder 19, the piston 20 will be moved downwardly, carrying with it the piston rod 21 and the head 40. Through the linkage 42, the arm 39 will thereby be swung in a clockwise direction, while the post 25 remains in its uppermost position under the influence of the spring 34, until said arm reaches the horizontal position illustrated in solid lines in FIG. 4. In this position of the arm 39, the arm will overlie the closed blow mold 13, with its blow heads 14 in spaced registry with the mouths 15 of the parisons in said blow mold and the head 40 will have just achieved contact with the extension 35. As the reciprocator 21 now continues to descend, the head 40 will entrain the extension 35, and thus the post 25, in its downward movement so that said reciprocator and said post will continue synchronously downward to move the several parts to the broken line positions of FIG. 4. Thus, the head 40 and the extension 35 may be construed to be cooperating stop means moving, respectively, with the reciprocator 21 and the post 25. During such synchronous movement, the arm 39 will maintain its horizontal attitude whereby the blow heads 14 will be moved rectilinearly into mating engagement with the blow molds.

Figure 3:
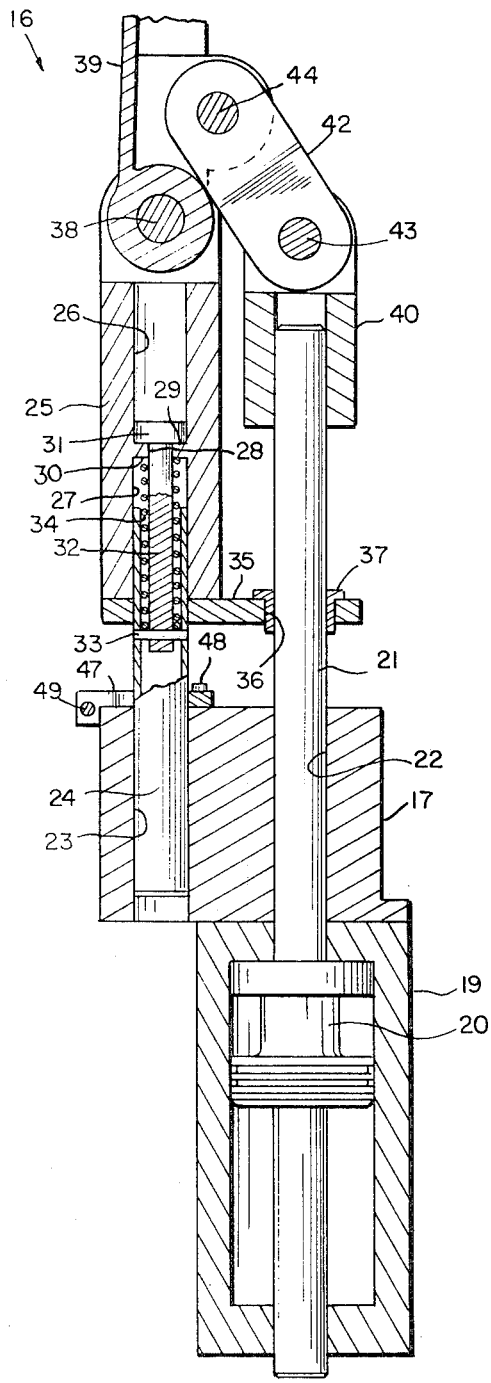
FIG. 3 is an enlarged, vertical section through the blow head assembly with the parts in positions of FIG. 1.

Upon completion of the blow, fluid will be supplied to the lower end of the cylinder 19 to move the reciprocator 21 upwardly. During the first, predetermined increment of such movement, the spring 34 will force the post 25 to move upwardly in synchronism with the reciprocator 21 until the shoulder 29 encounters the pin head 31. Since the pin is fixed relative to the guide tube 24, the post 25 will be stopped and continuing upward movement of the reciprocator 21 will cause the arm 39 to swing in a counterclockwise direction about the pin 38 into the position of FIGS. 1 and 3.

While the tube or guide 24 may be secured in the base 17 in any suitable manner, I prefer to mount it for precise adjustment vertically relative to the base. In the illustrated embodiment of the invention, a clamping plate 47 which snugly fits the diameter of the tube 24 is secured to the upper surface of the base 17 by a plurality of screws 48, and is provided with a clamping screw 49 whereby the arms of said plate may be drawn together tightly to grip the tube.

I claim:

1. A blow head assembly comprising substantially vertical guide means, a post guided for limited reciprocation relative to said guide means, an arm having a proximal end connected by pivot means to said post to swing in a substantially vertical plane and having a distal end, a blow head carried adjacent the distal end of said arm, a reciprocator adjacent said guide means and vertically reciprocable relative thereto, link means operatively connecting said reciprocator with a point on said arm spaced from said pivot means, means yieldably urging said post upwardly, and cooperating stop means connected to move, respectively, with said post and with said reciprocator and effective, when said arm reaches a predetermined position relative to said post during downward movement of said reciprocator, to entrain said post for synchronous downward movement with said reciprocator.

2. The blow head assembly of claim 1 in which said guide means is a stationary tube and said post is formed to provide an axial cavity, said cavity being restricted intermediate its ends to define an upwardly-facing shoulder and a downwardly-facing shoulder, the region of said cavity below said downwardly-facing shoulder telescopically receiving a portion of said tube, a pin having a head disposed in said cavity above said upwardly-facing shoulder and having a stem extending into said tube, and anchor means fixedly securing said stem to said tube, said means yieldably urging said post upwardly being expansion spring means confined between said anchor means and said downwardly-facing shoulder.

3. The blow head assembly of claim 1 in which said reciprocator is a rod slidably guided for reciprocation substantially in said vertical plane, said stop means moving with said post intersects the line of reciprocation of said reciprocator and is there perforated to receive said reciprocator snugly and slidably, and said stop means moving with said reciprocator is a head secured to said reciprocator at a point above said stop means moving with said post such that, when said arm reaches a horizontal position, said head will contact said stop means moving with said post to entrain the same.

4. The blow head assembly of claim 3 in which said head is secured to said reciprocator for vertical adjustment relative thereto.

5. The blow head assembly of claim 3 in which said head is clamped to said reciprocator for vertical adjustment relative thereto.

6. For use with a blow mold for forming hollow glassware, said mold including a mold cavity with an open mouth, a blow head assembly including vertical guide means, a post guided by said guide means for limited rectilinear reciprocation, a reciprocator mounted for reciprocation on an axis parallel with said guide means, an arm pivotally mounted on said post to swing, in a plane common to the axes of reciprocation of said post and said reciprocator, between a horizontal position and an angularly elevated position, link means operatively connecting said reciprocator with said arm, a blow head on said arm, said assembly being so associated with said blow mold that, when said arm is in its horizontal position, said blow head registers with said cavity mouth, and means for causing said post to move synchronously with said reciprocator whenever said reciprocator is below the level at which said arm attains its horizontal position.

(References on following page)

References Cited

UNITED STATES PATENTS

| | | | |
|---|---|---|---|
| 687,595 | 11/1901 | Blue | 65—261 X |
| 996,365 | 6/1911 | Richards et al. | 65—229 |
| 1,007,156 | 10/1911 | Stutz | 65—229 X |
| 1,177,135 | 3/1916 | Pawling | 65—229 |
| 1,976,239 | 10/1934 | Lurenz et al. | 65—264 X |
| 3,472,642 | 10/1969 | Irwin | 65—261 |
| 3,630,709 | 12/1971 | Irwin | 65—261 X |

FRANK W. MIGA, Primary Examiner

U.S. Cl. X.R.

65—80, 229, 233, 264, 300